UNITED STATES PATENT OFFICE.

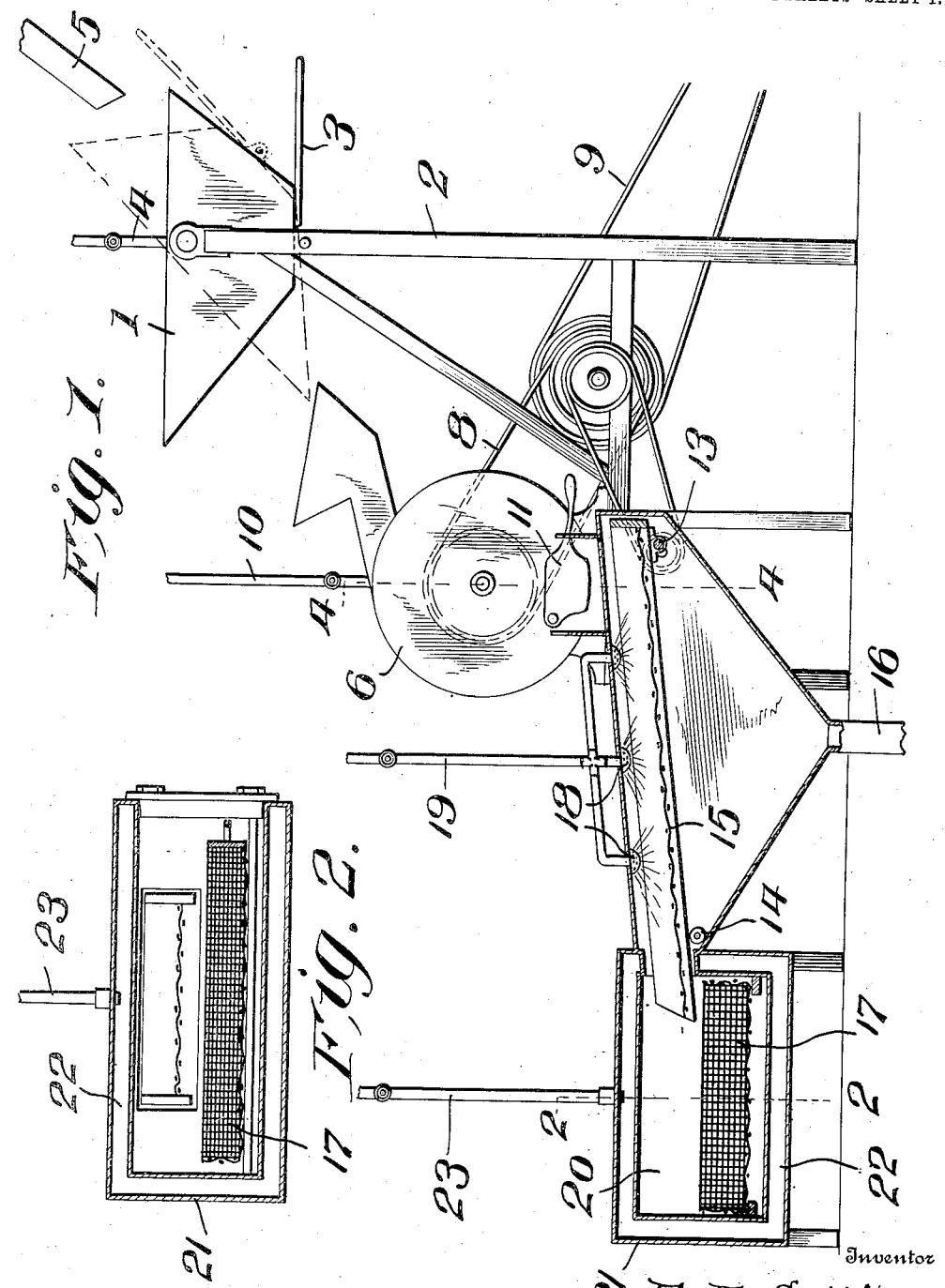

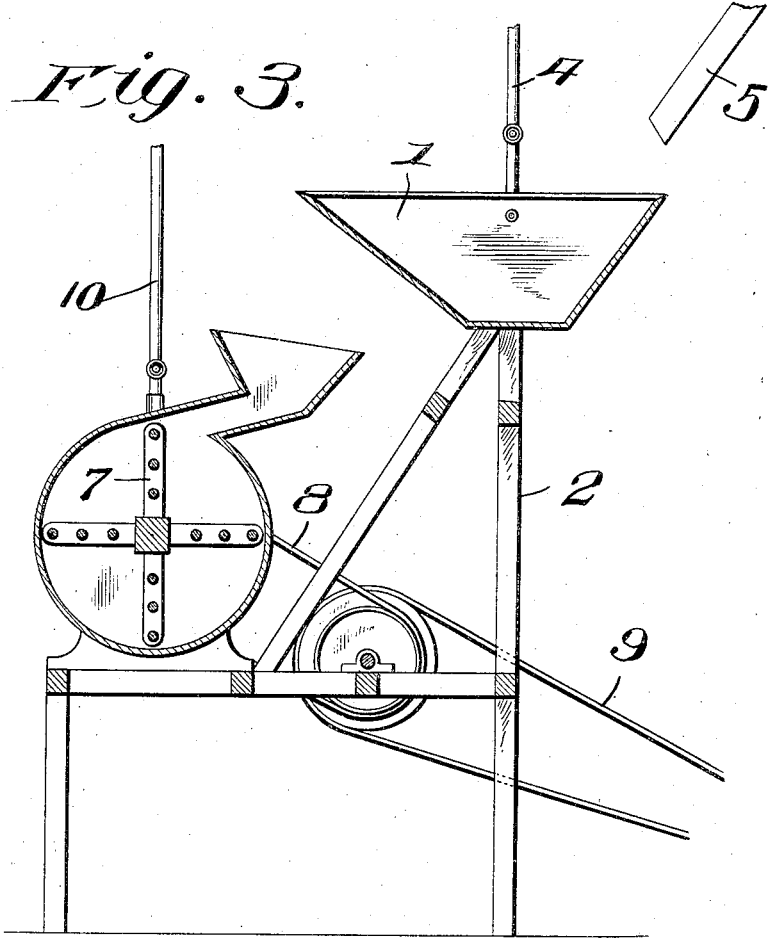
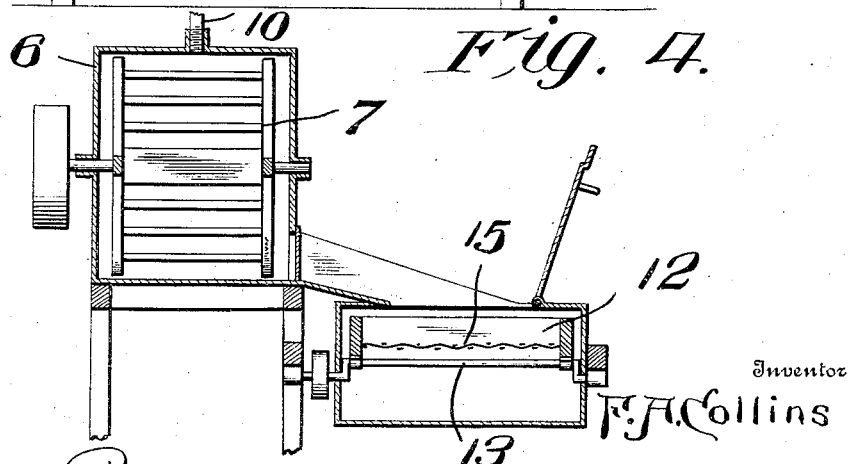

FREDERICK A. COLLINS, OF STARK, MAINE.

PREPARING CORN FOR TABLE USE.

No. 880,359.      Specification of Letters Patent.      Patented Feb. 25, 1908.

Application filed November 15, 1906. Serial No. 343,517.

*To all whom it may concern:*

Be it known that I, FREDERICK A. COLLINS, a citizen of the United States, residing at Stark, in the county of Somerset and State of Maine, have invented certain new and useful Improvements in Processes of Preparing Corn for Table Use; and I do hereby declare the following to be a full, clear, and exact description of the invention, such as will enable others skilled in the art to which it appertains to make and use the same.

My invention relates to a new and useful process of preparing corn for table use, and it has for its object to remove the hulls and black specks (hilum) from the corn and to partially cook the corn whereby it is sterilized and ready for serving by reheating.

Other objects and advantages will be hereinafter referred to and more particularly pointed out in the claims.

In the accompanying drawings which are made a part of this application I have shown the preferred form of apparatus employed in carrying out my process and in which Figure 1 is a side elevation partly in section of my improved device. Fig. 2 is a detail sectional view as seen from line 2—2, Fig. 1. Fig. 3 is a detail sectional view of the heating and agitating device, and Fig. 4 is a detail sectional view as seen from line 4—4, Fig. 1.

In carrying out my improved process 1 indicates a caldron which is pivotally mounted between suitable standards 2 and is provided with an operating handle 3.

The first step in preparing the corn is to fill the caldron substantially two-thirds full of boiling water, or if preferred the water may be heated through the medium of steam directed into the caldron through a steam pipe 4, and after the water has reached the proper temperature corn is directed into the caldron in any preferred manner as through a spout 5 disposed above the caldron. Previous to placing the corn into the caldron a quantity of the best condensed lye is added to the water and in a proportion of substantially 1½ pounds of lye to each bushel of corn placed in the caldron at one time.

After the corn is placed into the caldron the same is stirred and skimmed and this operation is repeated at intervals until the action of the lye and water upon the corn has sufficiently loosened the hulls and black specks that they may be readily removed.

The contents of the caldron is then deposited into a suitable huller 6 by tipping the caldron through the medium of the handle 3. The huller 6 is provided with a suitable agitator 7 which is adapted to revolve within the huller and thoroughly stir the corn deposited therein, the agitator being operated in any preferred manner as by suitable driving belts 8 and 9, the belt 9 extending to any suitable source of power. After the corn is deposited in the huller 6 a small quantity of water is added through the medium of a pipe 10 after which power is applied to the agitator and the same rotated until the black specks and hulls of the corn are separated. A slide 11 at the lower edge of the huller 6 is then opened and the contents of the huller deposited upon a suitable shaker 12, one end of which is secured to a crank shaft 13, while the opposite end thereof is supported by suitable rollers 14, the crank shaft 13 being rotated from the same source of power as the agitator 7 so that the shaker 12 will have an oscillating movement. The bottom of the shaker 12 is provided with a screen 15 which is preferably of meshed wire, and it will readily be seen that the water and particles of sediment such as the hulls and black specks will pass through the meshes of the screen and be carried away through a suitable waste pipe 16 while the corn will pass to the opposite or open end of said shaker and be deposited into a receiving pan 17 which is also preferably constructed of meshed wire.

Disposed immediately above the shaker 12 are a plurality of nozzles 18 which are connected to a steam pipe 19 so that when the corn is passing over the screen 15 steam will be directed through the path of the corn so that the same will be thoroughly cleansed by the time it reaches the receiving pan, thereby obviating the necessity of employing a rinsing chamber.

The receiving pan 17 is placed in an oven 20 which is likewise surrounded by a casing 21 forming a chamber 22 around the receiving pan into which is injected steam, a suitable pipe 23 being employed for that purpose, the steam in the chamber 22 being employed to dry the corn in the receiving pan, and as soon as the corn has become thoroughly dry the receiving pan is removed from the oven and the corn contained therein placed in suitable packages for shipment.

By this process it will be seen that while one batch of corn is being prepared in the caldron and passed through the huller that the batch previously treated will be drying in the oven so that by the time the batch in course of preparation is ready to be disposed into the receiving pan, the corn previously placed in the pan will be thoroughly dried. It will also be seen that by cleansing the corn with steam as it passes over the shaker 12 that a slight taste of the lye will be left in the corn, and at the same time sufficiently removing the lye so that no injurious effects will result to the user, which is a great advantage over the employment of water for cleansing the corn, as when water is used the corn becomes thoroughly soaked and the flavor of the lye entirely removed from the corn.

What I claim is:

1. The herein described process of preparing corn for table use, which consists in boiling the corn in water and lye, stirring and skimming at intervals till the hulls and black specks are loosened, then hulling the corn while being agitated and separating the hulls and black specks, then screening while subjecting it to the purifying action of steam, and finally drying.

2. The herein described process of preparing corn for table use, which consists in boiling the corn in water and lye, stirring and skimming at intervals, till the hulls and black specks are loosened, then hulling the corn after the addition of a small amount of water while being agitated and rotated till the black specks and hulls are separated, then passing over a screen and subjecting the same to oscillating motion and passing steam therethrough across its direction of movement, and finally drying.

In testimony whereof I have signed my name to this specification in the presence of two subscribing witnesses.

FREDERICK A. COLLINS.

Witnesses:
W. H. AVERY,
H. W. CARTER.